(12) United States Patent
Tominaga et al.

(10) Patent No.: US 7,621,367 B2
(45) Date of Patent: Nov. 24, 2009

(54) ELECTRIC POWER STEERING APPARATUS

(75) Inventors: Tsutomu Tominaga, Tokyo (JP); Tohru Hohtani, Hyogo (JP); Yasushi Yamaguchi, Tokyo (JP); Tadayuki Fujimoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 611 days.

(21) Appl. No.: 11/434,222

(22) Filed: May 16, 2006

(65) Prior Publication Data

US 2007/0144822 A1    Jun. 28, 2007

(30) Foreign Application Priority Data

Nov. 21, 2005    (JP) .............................. 2005-335399

(51) Int. Cl.
*B62D 5/04*    (2006.01)
(52) U.S. Cl. ........................................ 180/444; 180/446
(58) Field of Classification Search ................. 180/443, 180/444, 445, 446
See application file for complete search history.

(56) References Cited

U.S. PATENT DOCUMENTS

| | | | | |
|---|---|---|---|---|
| 6,078,155 | A * | 6/2000 | Tominaga et al. | 318/293 |
| 6,107,716 | A * | 8/2000 | Penketh | 310/89 |
| 6,123,167 | A * | 9/2000 | Miller et al. | 180/444 |
| 6,577,030 | B2 * | 6/2003 | Tominaga et al. | 310/68 B |
| 6,695,091 | B2 * | 2/2004 | Achenbach et al. | 180/444 |
| 7,021,418 | B2 * | 4/2006 | Tominaga et al. | 180/444 |
| 7,290,638 | B2 * | 11/2007 | Shiino et al. | 180/444 |
| 7,445,081 | B2 * | 11/2008 | Tominaga | 180/444 |
| 2005/0167183 | A1 * | 8/2005 | Tominaga et al. | 180/444 |
| 2005/0257992 | A1 * | 11/2005 | Shiino et al. | 180/444 |
| 2006/0108884 | A1 * | 5/2006 | Shiino et al. | 310/89 |
| 2007/0144822 | A1 * | 6/2007 | Tominaga et al. | 180/444 |
| 2007/0205038 | A1 * | 9/2007 | Tominaga et al. | 180/444 |
| 2007/0246289 | A1 * | 10/2007 | Tominaga | 180/444 |

FOREIGN PATENT DOCUMENTS

| | | |
|---|---|---|
| JP | 2000-160267 A | 6/2000 |
| JP | 2002-120739 A | 4/2002 |
| JP | 2003-182606 A | 7/2003 |
| JP | 2004-129484 A | 4/2004 |
| JP | 2004-237832 A | 8/2004 |
| JP | 2005-086855 A | 3/2005 |
| JP | 3638269 B2 | 4/2005 |

* cited by examiner

*Primary Examiner*—Lesley D Morris
*Assistant Examiner*—Marc A Scharich
(74) *Attorney, Agent, or Firm*—Sughrue Mion, PLLC

(57) ABSTRACT

A control unit including a plurality of boards is formed of a single multilayer metal substrate, whereby an electric power steering apparatus can be obtained in which connection members for connecting between the boards are made unnecessary, so the size and cost of the apparatus can be reduced, and the reliability of bonding can be improved. In the electric power steering apparatus, a power main body (20a) and a control main body (20b) are mounted on a metal substrate (22), and the power main body (20a) and the control main body (20b) are electrically connected to each other by wiring patterns (26a through 26e) and metal columns 28a through 28d in the metal substrate 22.

45 Claims, 10 Drawing Sheets

ELECTRIC POWER STEERING APPARATUS

BACKGROUND OF THE INVENTION

1. Field of the Invention

The present invention relates to an electric power steering apparatus equipped with an electric motor for outputting assist torque to the steering wheel of a vehicle, and a control unit for controlling the driving of the electric motor.

2. Description of the Related Art

In the past, there has been known an electric power steering apparatus which is equipped with an electric motor for outputting assist torque to the steering wheel of a vehicle, and a control unit mounted on the electric motor for controlling the driving of the electric motor (see, for example, a first patent document (Japanese patent No. 3638269).

This electric power steering apparatus includes a power board on which a bridge circuit is mounted for switching the current of the electric motor, a control board on which a microcomputer is mounted for generating a drive signal to control the bridge circuit, and a high current board on which a conductive plate forming a high current wiring pattern is insert molded and on which a capacitor is mounted for absorbing current ripples, wherein the power board, the high current board and the control board are stacked or laminated one over another in this order so as to form a three-layer structure.

In the above-mentioned electric power steering apparatus, the control unit has a substrate comprising the three boards, i.e., the power board, the high current board and the control board, which are laminated one over another in this order to form the three-layer structure. Accordingly, the height of the control unit becomes large, and connecting members for connecting these boards with one another are required at the same time, resulting in increased connection or joint portions.

As a result, there arises a problem that the apparatus becomes large in size, high in cost, and low in reliability of electrical connections.

SUMMARY OF THE INVENTION

Accordingly, the present invention is intended to obviate the problem as referred to above, and has its object to provide an electric power steering apparatus which can be reduced in size and cost, and improved in reliability of electrical connections by constructing a power board, a high current board and a control board by the use of a single substrate.

Bearing the above object in mined, according to the present invention, there is provided an electric power steering apparatus including an electric motor for outputting assist torque to a steering wheel of a vehicle, and a control unit for controlling the driving of the electric motor. The control unit includes: a power main body that includes a bridge circuit composed of a plurality of semiconductor switching elements for switching a current supplied to the electric motor in accordance with torque assisting the steering wheel; a control main body that generates a drive signal to control the bridge circuit based on the steering torque of the steering wheel; a metal substrate that is composed of a plurality of insulating layers and a plurality of conductive layers having wiring patterns respectively formed thereon, the insulating layers and the conductive layers being alternately laminated one over another on a metal plate; and a heat sink with the metal substrate being fixedly attached thereto. The power main body and the control main body are arranged on the same surface of the metal substrate, and the power main body and the control main body are electrically connected to each other through the metal substrate.

According to the electric power steering apparatus of the present invention, the power main body and the control main body are mounted on the single metal substrate, so the apparatus can be reduced in size and cost, and the reliability of electrical connections can be improved.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Figure 1:
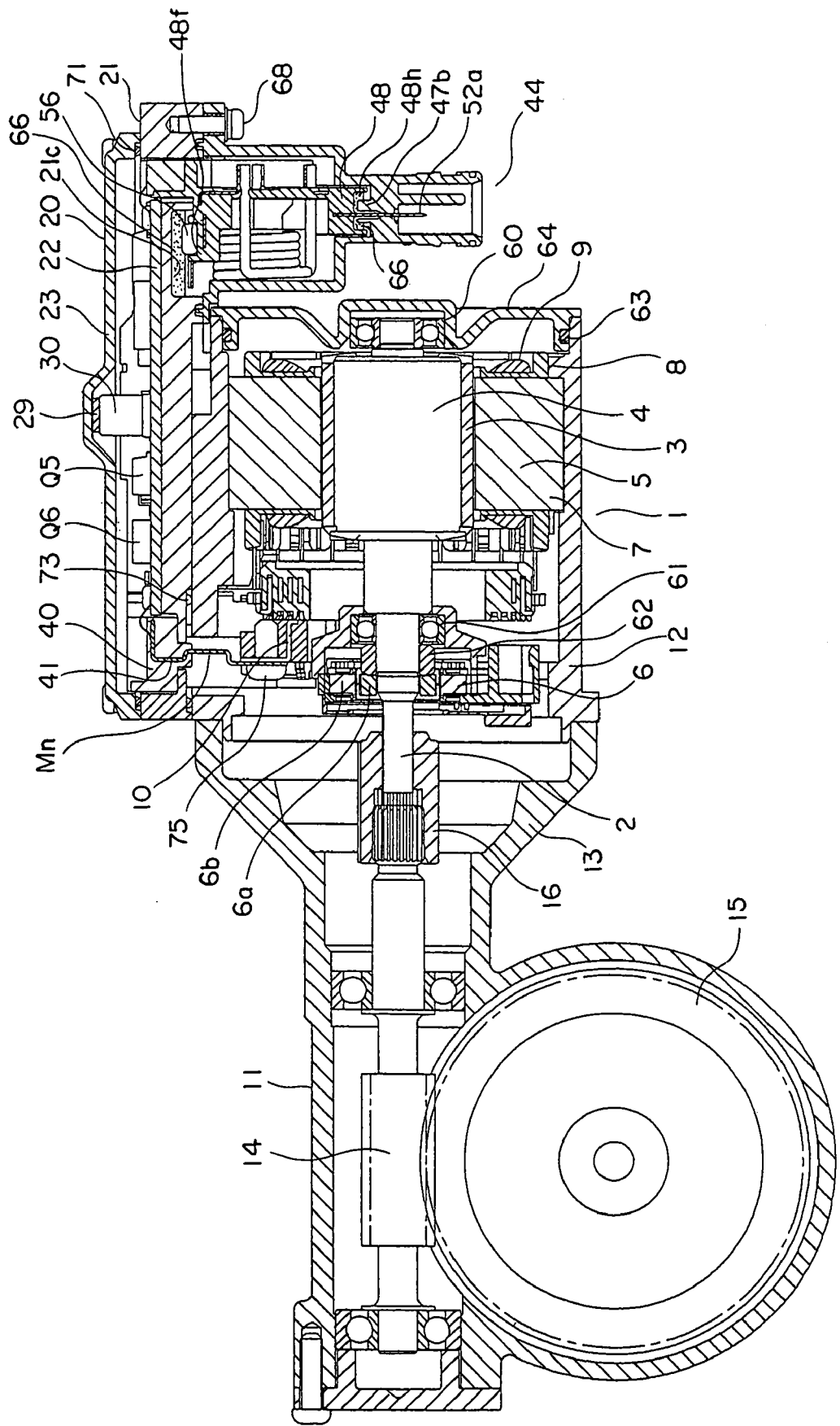
FIG. 1 is a cross sectional view showing an electric power steering apparatus according to a first embodiment of the present invention.

Now, preferred embodiments of the present invention will be described in detail while referring to the accompanying drawings. In the respective embodiments, the same or corresponding members or parts are identified by the same reference numerals or characters.

Embodiment 1

Figure 2:
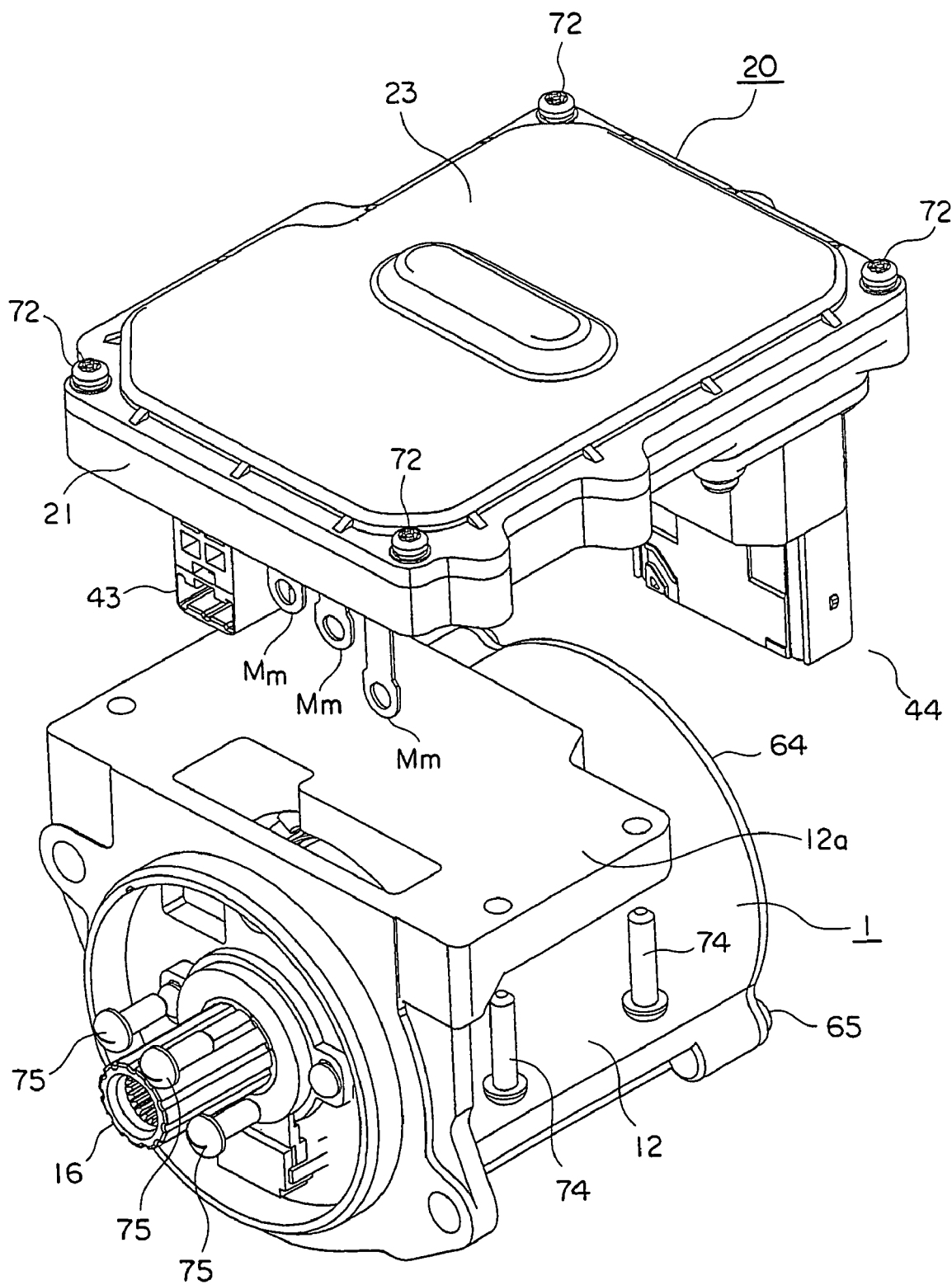
FIG. 2 is an exploded perspective view showing the electric power steering apparatus in FIG. 1.
Figure 3:
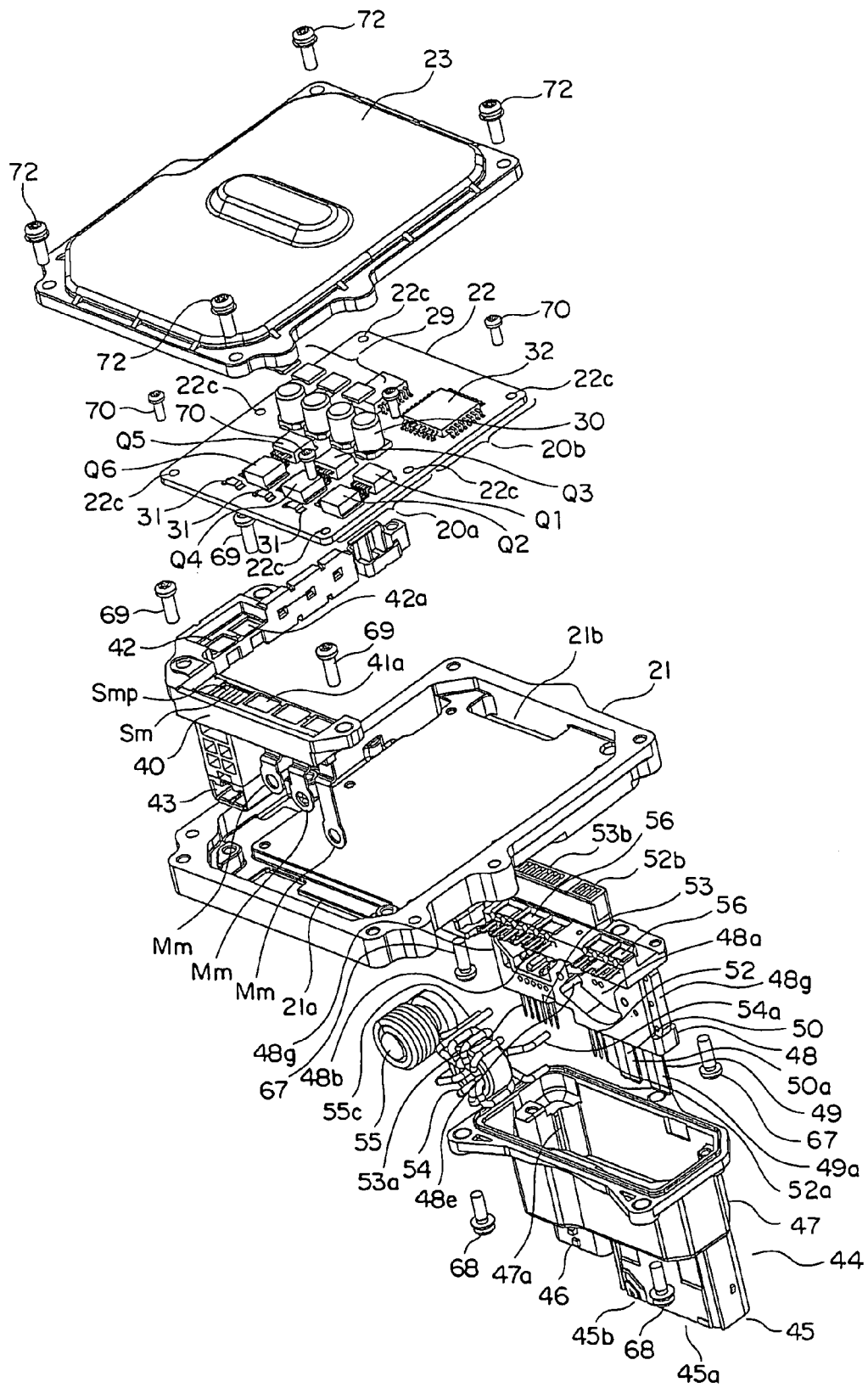
FIG. 3 is an exploded perspective view showing a control unit of the electric power steering apparatus in FIG. 1.

FIG. 1 is a cross sectional view that shows an electric power steering apparatus according to a first embodiment of the present invention. FIG. 2 is an exploded perspective view that shows the electric power steering apparatus in FIG. 1, and FIG. 3 is an exploded perspective view that shows a control unit 20 in FIG. 2.

In these figures, an electric motor 1 in the form of a three-phase brushless motor of this electric power steering apparatus is provided with an output shaft 2, a rotor 4 with a permanent magnet 3 having eight magnetic poles fixedly attached to the output shaft 2, a stator 5 arranged around the rotor 4, and a rotational position sensor 6 arranged at an output side of the output shaft 2 for detecting the rotational position of the rotor 4.

The stator 5 has twelve salient poles 7 arranged in opposition to the outer periphery of the permanent magnet 3, insulators 8 attached to these salient poles 7, respectively, and armature windings 9 of three phases U, V and W wound around the insulators 8, respectively. The armature windings 9 have their three end portions connected with three winding terminals 10, respectively, extending in an axial direction at the output side of the output shaft 2.

The rotational position sensor 6 is composed of a resolver, and has a resolver rotor 6a and a resolver stator 6b. The outside diameter or contour of the resolver rotor 6a is formed into a special curve so that the permeance of a diametral clearance or gap between the reservoir stator 6b and the resolver rotor 6a changes in a sinusoidal manner at a relative angle therebetween. An excitation coil and two sets of output coils are wound around the resolver stator 6b, so that a change in the diametral gap between this the resolver rotor 6a and the resolver stator 6b can be detected and output from the output coils as two-phase output voltages that change in a sine curve and in a cosine curve, respectively.

The electric motor 1 is fixedly attached to a reduction mechanism in the form of a reduction gear 11. The reduction gear 11 includes a gear case 13 to which a housing 12 of the electric motor 1 is attached, a worm gear 14 that is arranged in the gear case 13 and for decelerating the rotation of the output shaft 2, and a worm wheel 15 that is in meshing engagement with the worm gear 14. The worm gear 14 is formed, at an end portion thereof near the electric motor 1, with a spline. A coupling 16 with a spline formed on its inner side is press-fitted into an end portion of the output shaft 2 near the reduction gear 11. Thus, the coupling 16 and the one end portion of the worm gear 14 are coupled with each other through their splines, so that torque can be transmitted from the electric motor 1 to the reduction gear 11 through the coupling 16.

The control unit 20 for controlling the driving of the electric motor 1 is fixedly secured to a bracket 12a that is formed at an upper portion of the housing 12 of the electric motor 1, as shown in the FIG. 2.

The control unit 20 includes a heat sink 21 that is in the shape of a box and is made of aluminum of high conductivity, a metal substrate 22 arranged in the heat sink 21, a cover 23 made of aluminum that cooperates with the heat sink 21 to receive the metal substrate 22, etc., in its interior, and a connector 44.

The heat sink 21, the metal substrate 22 and the cover 23 are arranged in parallel to the axial direction of the electric motor 1.

Figure 4:
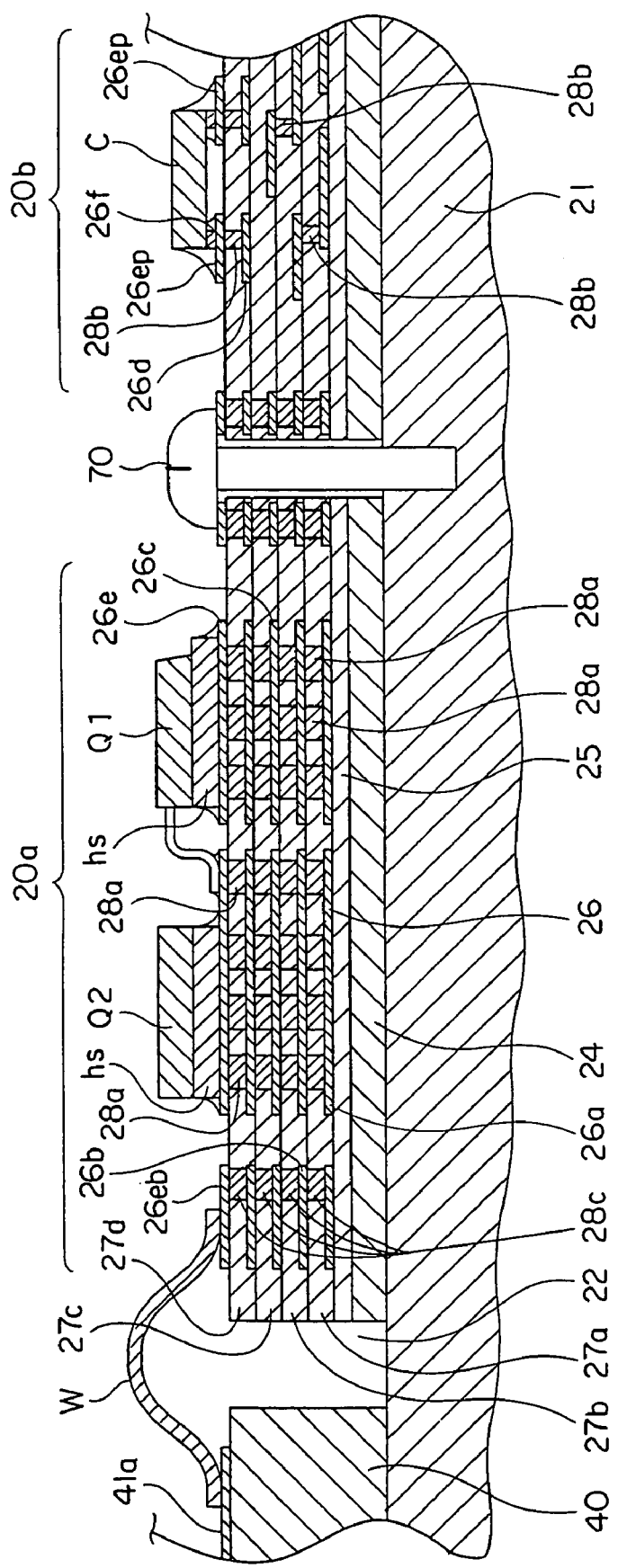
FIG. 4 is a partial cross sectional view showing a metal substrate of the electric power steering apparatus in FIG. 1.

FIG. 4 is a cross sectional view of the metal substrate 22, and the metal substrate 22 is composed, for instance, of an AGSP (a registered trademark of Daiwa Co., Ltd.) substrate, with a wiring pattern 26a being formed on a metal plate 24 made of aluminum of 2 mm thick as a copper pattern of 35 μm through a heat dissipation insulating layer 25 of 80 μm. On the metal plate, four interlayer insulating layers 27a, 27b, 27c, 27d each of 60 μm thick, and four wiring patterns 26b, 26c, 26d, 26e made of copper of 35 μm thick are laminated, respectively, one over another in an alternate manner. Accordingly, the wiring patterns 26a through 26e in the form of conductive layers are formed in five layers, and the wiring patterns 26a through 26e are connected with one another by means of interlayer power circuit metal columns (bumps) 28a and interlayer control circuit metal columns 28b, respectively.

In order to raise the packaging density of parts mounted on the wiring pattern 26e on the top layer thereby to make the outside dimensions of the metal substrate 22 small, it is preferable that no wiring pattern other than a check pattern for checking the metal substrate 22 after the mounting of parts be formed on the uppermost or outermost wiring pattern 26e.

Accordingly, it is constructed such that a majority of wiring among the parts mounted on the metal substrate 22 is carried out by four layers of wiring patterns 26a through 26d excepting the wiring pattern 26e on the top layer.

In the metal substrate 22, the uppermost insulating layer 27d is formed of a material whose modulus of elasticity is smaller than those of the other insulating layers 27a through 27c. The insulating layer 27d with a small modulus of elasticity serves to reduce the stress generated at soldered portions in the form of brazed portions of parts in the use environment of a motor vehicle, for example due to a temperature change between −40° C. and 125° C., thereby improving the reliability of bonding or connection of the soldered portions of the parts.

In addition, in the metal substrate 22, neither any power circuit metal column body nor any control circuit metal column body is arranged in the heat dissipation insulating layer 25 on the metal plate 24, so it is necessary for the heat dissipation insulating layer 25 itself to radiate heat. Thus, the heat dissipation insulating layer 25 is made of a material which is larger in thermal conductivity than the insulating layers 27a through 27d.

On the metal substrate 22, there are mounted a power main body 20a at the output side of the electric motor 1, and control main body 20b at the opposite side thereof, as shown in FIG. 3.

The power main body 20a is comprised of high current parts such as semiconductor switching elements (e.g., FET) Q1 through Q6 that constitutes a three-phase bridge circuit for switching a motor current of the electric motor 1, capacitors 30 that absorb ripples of the motor current, shunt resistors 31 that detect the current of the electric motor 1, and so on. These high current parts are mounted on the wiring pattern 26e through soldering.

A thermal conductive sheet 29 having high conductivity and excellent flexibility is fitted between the upper surface of each capacitor 30 and the inner wall surface of the cover 23.

Between the adjacent layers of the wiring patterns 26a through 26e arranged in opposition to heat dissipation plates (heat spreaders) hs of the semiconductor switching elements Q1 through Q6, there are formed a plurality of power circuit metal column bodies on parallel lines in the thickness direction of the metal substrate 22.

Since the interlayer insulating layers 27a, 27b, 27c, 27d are formed by thermally pressing a resin-coated copper foil (RCC), the power circuit metal column body between the adjacent layers of the wiring patterns 26a through 26e are formed of a plurality of divided power circuit metal columns 28a. The power circuit metal columns 28a each have a circular shape in cross section, so the flowability of a resin of the resin-coated copper foil can be improved, and hence internal defects or flaws of the metal substrate 22 can be reduced.

In this embodiment, the power circuit metal columns 28a are each formed into a bump structure with a circular cross section, but a through hole structure may instead be employed which has a ring-shaped cross sectional configuration. In addition, a resin having high thermal conductivity may be filled into the hollow interior of a through hole.

The control main body 20b is composed of low current parts such as a microcomputer 32, a drive circuit (not shown), a peripheral circuit element including a motor current detection circuit (not shown) and so on. These low current parts are mounted on the wiring pattern 26e by soldering.

The microcomputer 32 calculates an assist torque based on the motor current, which flows into the motor 1 through one end of each shunt resistor 31 and is detected by the motor current detection circuit (not shown), and a steering torque signal from a torque sensor (not shown), and calculates a current corresponding to the assist torque by feeding back the motor current and the rotational position of the rotor 4 detected by the rotational position sensor 6. The microcomputer 32 outputs drive signals to control the semiconductor switching elements Q1 through Q6 of the bridge circuit.

In addition, the microcomputer 32 includes, though not illustrated, a well-known self-diagnosis function in addition to an AD converter, a PWM timer circuit, etc., and always carries out self-diagnosis so as to determine whether the system operates normally, so that it can interrupt the motor current upon occurrence of abnormality.

The power main body 20*a* and the control main body 20*b* are arranged on the single metal substrate 22, and are electrically connected to one another by means of the wiring patterns 26*a* through 26*e*, the interlayer power circuit metal columns 28*a* and the interlayer control circuit metal columns 28*b*. Accordingly, signal transmission between the control main body 20*b* and the power main body 20*a* is carried out through the wiring patterns 26*a* through 26*e*, the power circuit metal columns 28*a* and the control circuit metal columns 28*b* formed in the metal substrate 22.

In the power main body 20*a* including the high current parts such as the semiconductor switching elements Q1 through Q6, the capacitors 30, the shunt resistors 31 and so on, it is necessary for the power circuit metal columns 28*a* to pass heat and a large current in the vicinity of the high current parts, so it is desirable that the power circuit metal columns 28*a* each have a cross-sectional area as large as possible.

In contrast to this, in the control main body 20*b*, the stress generated in the soldered portions of parts due to a temperature change can be reduced, so it is desirable that the control circuit metal columns 28*b* each have a cross-sectional area as small as possible. Therefore, the cross-sectional area of each of the power circuit metal columns 28*a* is formed to be larger than the cross-sectional area of each of the control circuit metal columns 28*b*. It is preferable that each of the power circuit metal columns 28*a* have a circular shape with a diameter of 0.7 mm or more in cross section, and that each of the control circuit metal columns 28*b* have a circular shape with a diameter of 0.4 mm or less in cross section.

As shown in FIG. 4, in the metal substrate 22, pad portions 26*ep* are formed on the wiring pattern 26*e* on the top layer, and a lower surface of each pad portion 26*ep* and an upper surface of the second uppermost wiring pattern 26*d* are connected to each other by means of a corresponding control circuit metal column 28*b*. A convex portion 26*f* is formed on an upper surface of each pad portion 26*ep*, and a capacitor C is mounted on adjacent convex portions 26*f* and connected at its opposite ends with the pad portions 26*ep* by soldering. At this time, the soldering of the capacitor C is made while being lifted from the associated pad portions 26*ep* by the convex portions 26*f*, so that solder layers are thus formed to be thick in their portions except for those portions which correspond to the convex portions 26*f*.

Accordingly, stresses generated in the soldered portions of parts (i.e., the capacitor C) due to a temperature change in the use environment of the motor vehicle are reduced, so that the reliability of bonding or connection of the soldered portions can be improved. Here, note that the parts as referred to above may be ones of non-lead type such as resistors, etc., other than the capacitor C.

Moreover, wire bonding pad portions 26*eb*, to which wires W made of aluminum and each having a diameter of 300 µm are wire bonded, are formed in the wiring pattern 26*e* on the top layer of the metal substrate 22, as shown in FIG. 4. The wire bonding pad portions 26*eb* each have a lower surface connected to an upper surface of the second uppermost wiring pattern 26*d* by a wire metal column 28*c*. Further, between the adjacent layers of the wiring patterns 26*a* through 26*d*, there are formed wire metal columns 28*c* on a line in the thickness direction of the metal substrate 22, but a wire metal column 28*c* should be arranged at least between the lower surface of each wire bonding pad portion 26*eb* and the upper surface of the second uppermost wiring pattern 26*d*.

The bonding or connection of each wire W and each corresponding wire bonding pad portion 26*eb* is made at a location excluding a portion that extends over the corresponding wire metal column 28*c* and the interlayer insulating layer 27*d* in the lower surface of the wire bonding pad portion 26*eb*. That is, each wire W is wire bonded to a corresponding wire bonding pad portion 26*eb* in a region thereof in which the interlayer insulating layer 27*d* is formed on the lower surface of the wire bonding pad portion 26*eb*.

Figure 5:
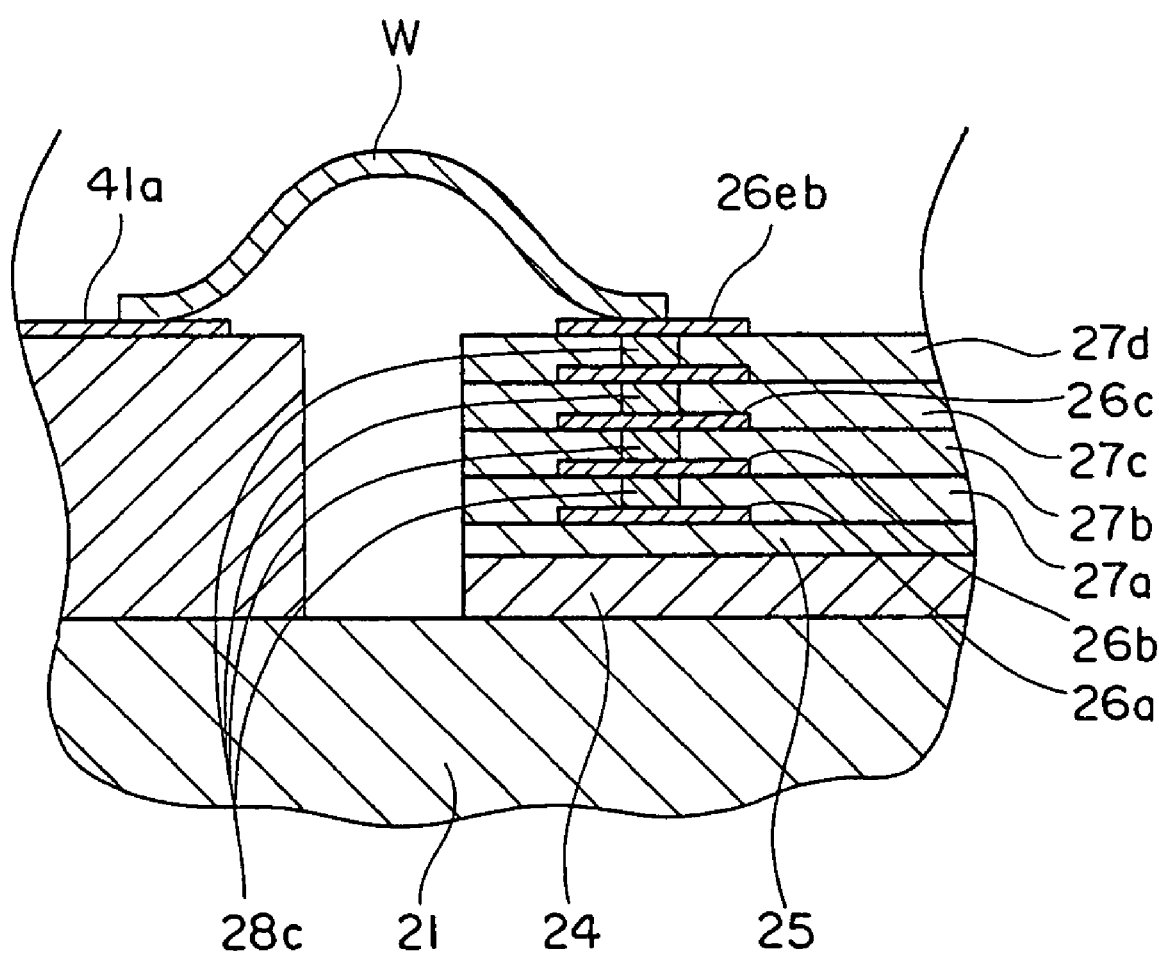
FIG. 5 is a partial cross sectional view showing a modified form of the metal substrate of the electric power steering apparatus in FIG. 1.

Alternatively, as shown in FIG. 5, each wire W is wire bonded to a corresponding wire bonding pad portion 26*eb* in a region thereof in which a corresponding wire metal column 28*c* is formed on the lower surface of the wire bonding pad portion 26*eb*.

When each wire W is bonded to a corresponding wire bonding pad portion 26*eb* with their connecting portion or junction extending over the boundary of the corresponding wire metal column 28*c* and the interlayer insulating layer 27*d* in the lower surface of the wire bonding pad portion 26*eb*, the propagation of the ultrasonic wave used for wire bonding in the junction varies between a region corresponding to the wire metal column 28*c* and a region corresponding to the interlayer insulating layer 27*d*, thus resulting in reduced bonding or joint strength.

In addition, a metal column 28*c* formed downward from a corresponding wire bonding pad portion 26*eb* may have a cross-sectional area equal to that of each power circuit metal column 28*a*.

Figure 6:
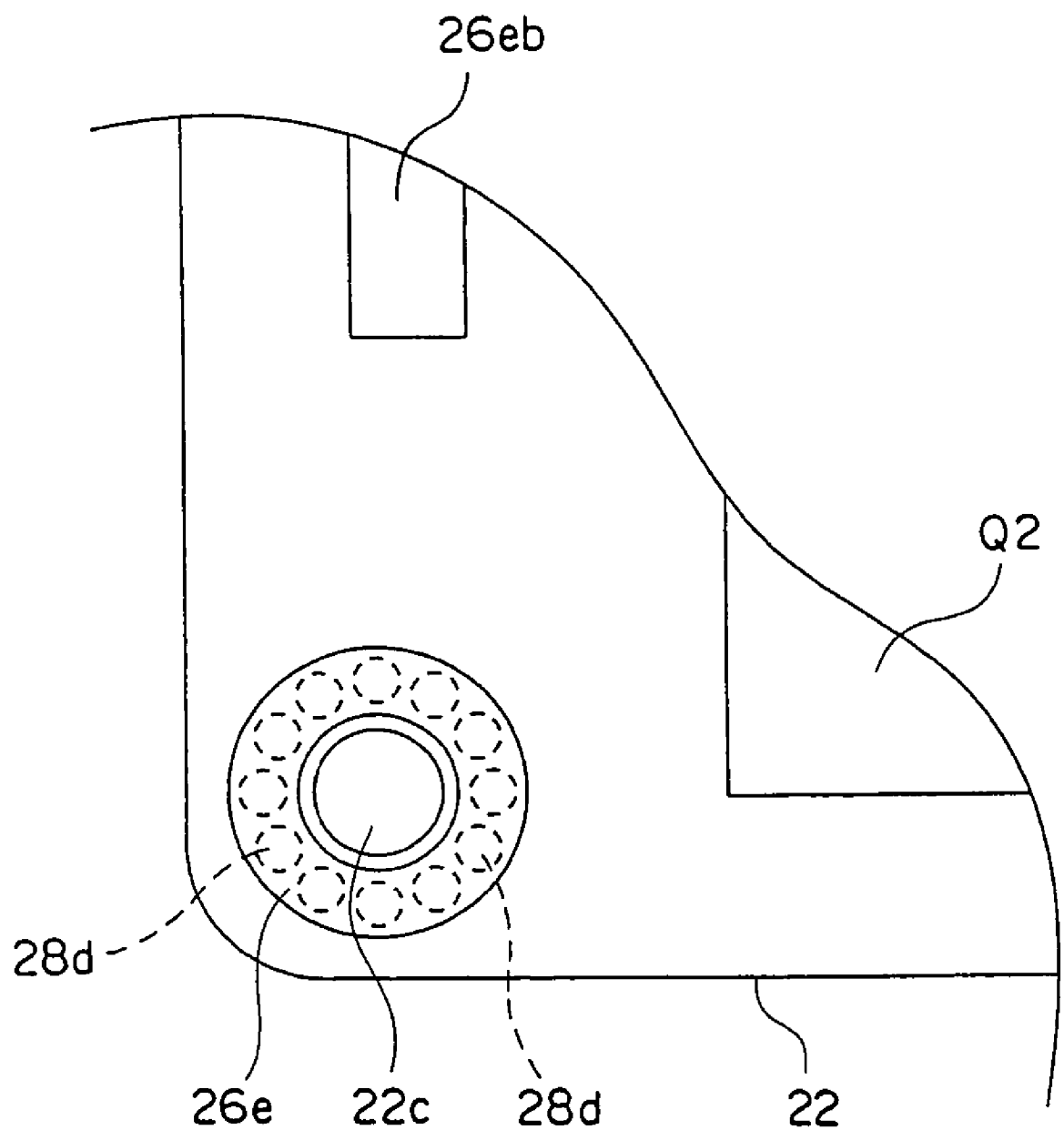
FIG. 6 is a plan view showing a part of the metal substrate of the electric power steering apparatus in FIG. 1.

As shown in FIG. 3, the metal substrate 22 has holes 22*c* formed therethrough at six locations in the peripheral portion thereof, and the metal substrate 22 is fixedly secured to the heat sink 21 by means of screws 70 threaded into these holes 22*c*. Around each hole 22*c*, there are arranged in a circular manner twelve fixed metal columns 28*d*, as shown in FIG. 6, which are disposed between adjacent layers of the wiring patterns 26*a* through 26*e* on individual lines in the thickness direction of the metal substrate 22. Further, the fixed metal columns 28*d* are arranged under a bearing surface of the head of each screw 70, so that a force generated by tightening of the screw 70 is applied to the fixed metal columns 28*d*.

In case where the metal substrate 22 are tightened to the heat sink 21 by means of the screws 70 through the insulating layer 27*d* and the other interlayer insulating layers 27*a* through 27*c* having small modulus of elasticity, the screws 70 are easy to loose, but by tightening the metal substrate 22 to the heat sink 21 with the screws 70 through the fixed metal columns 28*d*, the screws 70 become difficult to loose, so the metal substrate 22 can be made in intimate contact with the heat sink 21.

Accordingly, the heat generated by heat-generating parts on the metal substrate 22 is efficiently conducted to the housing 12 of the electric motor 1 via the heat sink 21.

Here, note that the number of fixed metal columns 28*d* is not of course limited to twelve, but may be any value appropriate for heat conduction. Also, each of the fixed metal columns 28*d* may be of a cylindrical through hole structure, similar to the power circuit metal columns 28*a*.

Although the metal plate 24 is made of aluminum in this embodiment, an AlSiC material may be used in which silicon carbide particles are dispersed in an aluminum material. The AlSiC material is higher in cost than aluminum but has a rigidity greater than that, so the thickness of the metal plate 24 can be made thinner than that of an aluminum plate, but it is preferable to select the thickness in a range substantially between 1.4 mm and 1.6 mm.

Further, the AlSiC material is smaller in the coefficient of thermal expansion than aluminum, and hence the reliability of solder bonding or joint of the parts mounted on the metal substrate 22 by soldering can be improved. In case where the AlSiC material is used for the metal plate 24, it is preferable that an AlSiC material having a similar coefficient of thermal expansion be used for the heat sink 21.

In a frame 40, conductive plates 41, 42 are insert molded in an insulating resin, with the conductive plates 41 being exposed from the insulating resin at portions to be electrically connected, as shown in FIG. 3. Motor terminals Mm, being formed as one ends of the conductive plates 41, respectively, are protruded from corresponding holes 21a, which are opening portions formed in the heat sink 21, so as to be inserted into the electric motor 1 for electrical connection with the winding terminals 10. The conductive plates 41 have pad portions 41a formed at the other ends thereof, respectively, in a manner exposed from the insulating resin for connection to the bridge circuit of the power main body 20a of the metal substrate 22 through wires bonded thereto by wire bonding.

The conductive plates 42 have pad portions 42a in the form of power supply terminals formed at one ends thereof, respectively, in a manner exposed from the insulating resin, and the pad portions 42a are connected to the power main body 20a through wires bonded thereto by wire bonding.

In addition, the sensor connector 43 is integrally formed with the frame 40, and is fitted into a connector (not shown) from the rotational position sensor 6. In the sensor connector 43, a sensor terminal Sm for sending a signal from the rotational position sensor 6 to the microcomputer 32 is insert molded into the insulating resin.

The sensor terminal Sm has one end exposed from the insulating resin to form a pad portion Smp, and the exposed pad portion Smp is connected to the control main body 20b through a wire bonded thereto by wire bonding.

The connector 44 is composed of a power connector 45a electrically connected to a battery (not shown) of the vehicle, a signal connector 45b by which signals are input from and output to the vehicle side through external wiring, and a torque sensor connector 46 to which a signal from a torque sensor (not shown) is input. The power connector 45a and the signal connector 45b are integrated with each other to form a vehicle connector 45, and the vehicle connector 45 and the torque sensor connector 46 are arranged in side by side.

Moreover, the connector 44 is composed of a connector housing 47 and a connector frame 48 received in the connector housing 47, and is fixedly secured to the heat sink 21 at a side opposite to the metal substrate 22. Further, the connector 44 is arranged at a side of the metal substrate 22 opposite to the heat sink 21, and it also is arranged in the vicinity of a rear end of the electric motor 1 that is at a side opposite to an output side of the electric motor 1.

In the connector housing 47, a housing of the power connector 45a, a housing of the signal connector 45b, and a housing of the torque sensor connector 46 are integrally molded with an insulating resin.

In the connector frame 48, a conductive plate 49 having a plus terminal 49a of the power connector 45a formed at one end thereof, a conductive plate 50 having a minus terminal 50a of the power connector 45a formed at the one end, a plurality of conductive plates 51 constituting other wiring patterns, a connector terminal 52 having a terminal 52a of the signal connector 45b formed at one end thereof, and a connector terminal 53 having a terminal 53a of the torque sensor connector 46 formed at one end thereof are all insert molded into an insulating resin.

Also, in the connector frame 48, exposed from the insulating resin are the plus terminal 49a and the minus terminal 50a of the power connector 45a, the terminal 52a of the signal connector 45b, the terminal 53a of the torque sensor connector 46, the portions of the conductive plates 49, 50, 51 which are to be electrically connected, the pad portions 52b, 53b of the metal substrate 22 connected to the control main body 20b through the wires bonded thereto by wire bonding, and so on. Thus, the vehicle connector 45 and the torque sensor connector 46 are integrally formed with the connector housing 47 and the connector frame 48, respectively.

On the connector frame 48, there are mounted, coils 54, 55 and capacitors 56 that serve to prevent electromagnetic noise generated upon the switching operation of the semiconductor switching elements Q1 through Q6 of the power main body 20a from flowing out to the outside, and they are connected to the conductive plates 49, 50, 51, respectively, of the connector frame 48.

In addition, the connector frame 48 is formed with coil receiving portions 48a, 48b, in which the coils 54, 55 are received and held by being inserted thereinto in a orthogonal direction with respect to the terminals 49a, 50a, 52a of the vehicle connector 45 and the terminal 53a of the torque sensor connector 46.

Figure 7:
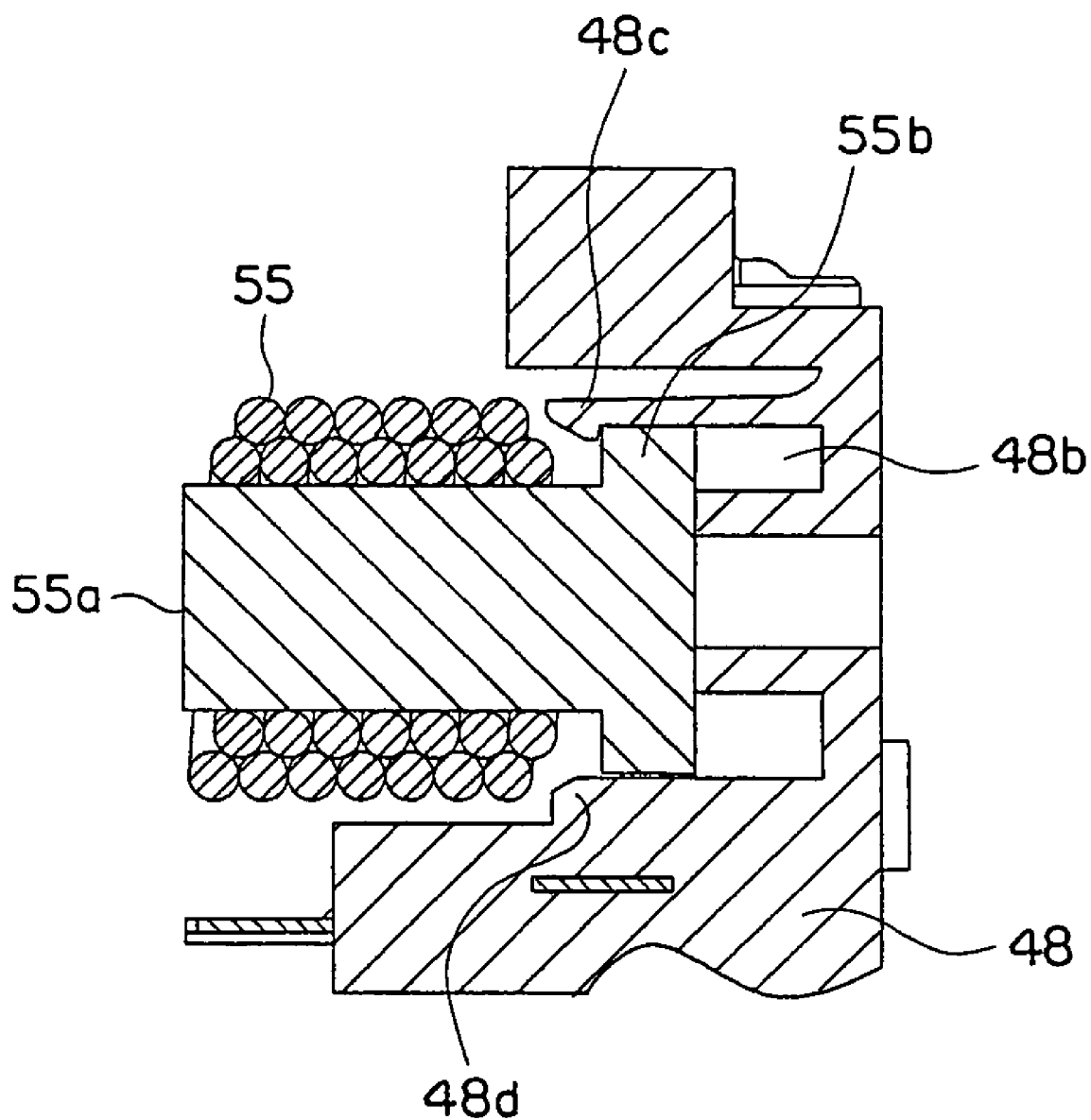
FIG. 7 is a partial cross sectional view of the control unit of FIG. 1.

FIG. 7 is a cross sectional view of essential portions of the connector frame 48, in which the coil receiving portion 48b is formed on its bottom with a protrusion-like detent 48c and a guide 48d for engagement with the coil 55. The coil 55 is constructed by winding a conductor around a core 55a which has a T-shaped cross section when cut along an axial direction thereof. In the core 55a, a large-diameter portion 55b of the coil 55 is guided by the guide 48d, so that when it is inserted up to the bottom of the coil receiving portion 48b, the detent 48c in the form of an engagement portion is elastically engaged with the large-diameter portion 55b, thereby fixedly attaching the coil 55 to the connector frame 48.

The terminals 54a, 55c of the coils 54, 55 penetrate through holes 48e formed in the bottoms of the coil receiving portions 48a, 48b to protrude from the connector frame 48, so that they are welded and electrically connected to the conductive plates 49, 50, 51 exposed from the insulating resin.

Figure 8:
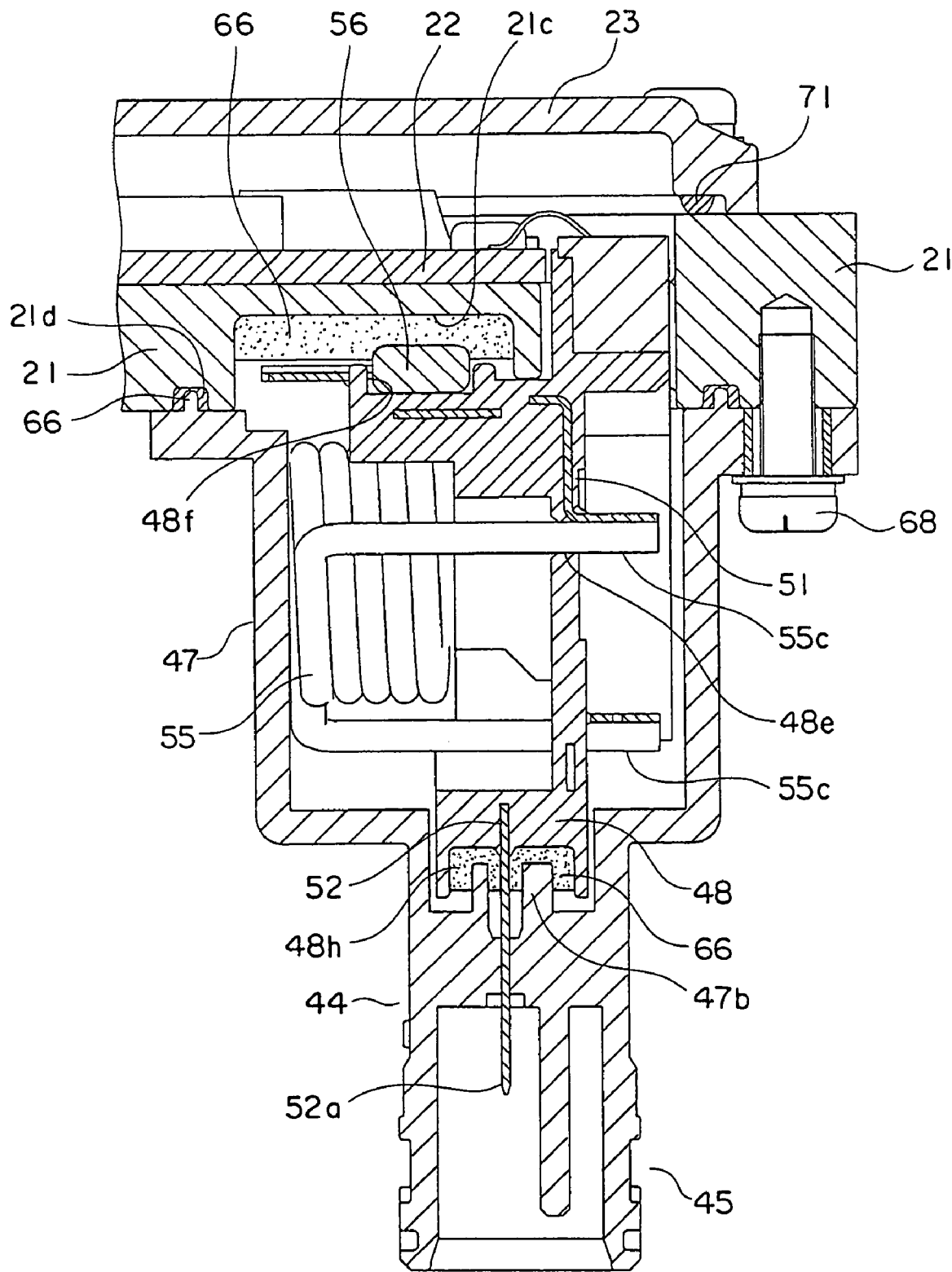
FIG. 8 is another partial cross sectional view of the control unit of FIG. 1.

FIG. 8 is a cross sectional view of essential portions of the connector frame 48, in which the connector frame 48 is formed with capacitor receiving portions 48f that receive the capacitors 56, respectively. In the capacitor receiving portions 48f, the capacitors 56 are arranged and received in a line or row, as shown in FIG. 3. The conductive plates 49, 50, 51 are partially exposed from the insulating resin at one end side of the capacitor receiving portions 48f, and the thus exposed conductive plates 49, 50, 51 are connected to corresponding terminals of the capacitors 56 by TIG welding. The welded portions, being arranged on a straight line, are continuously connected by TIG welding.

The connector housing 47 is formed with guide portions 47a that serve to guide opposite side portions 48g of the connector frame 48 when the connector frame 48 is inserted into the connector housing 47. In a state where the connector frame 48 has been completely inserted into the connector housing 47, the side portions 48g of the connector frame 48 are fitted into the guide portions 47a, and the terminals 49a, 50a, 52a, 53a of the connector 44 and the housing of the connector 44 are positioned in an appropriate manner.

Moreover, in the connector 44, an adhesive resin 66 is filled in between a terminal inserted portion, which is formed on the connector housing 47 and into which the terminals 49a, 50a, 52a, 53a are inserted, and a terminal protruded portion, which is formed on the connector frame 48 and into which the terminals 49a, 50a, 52a, 53a protrude.

Specifically, as shown in FIG. 8, the connector frame 48 has a concave portion 48h formed in a portion thereof into which the terminals 49a, 50a, 52a, 53a protrude, and the connector housing 47 has a convex portion 47b formed at an entrance portion thereof into which the terminals 49a, 50a, 52a, 53a are inserted. The adhesive resin in the form of a silicon bonding material 66 is filled into a gap formed between the concave portion 48h and the convex portion 47b with the connector housing 47 being completely inserted into the connector frame 48, whereby the air tightness between the terminals 49a, 50a, 52a, 53a and the connector housing 47 is ensured.

The heat sink 21 has a concave portion 21c formed in a portion onto which the connector frame 48 is mounted, with the concave portion 21c and the capacitors 56 being arranged in opposition to each other. The silicon bonding material 66 is filled into a gap between the concave portion 21c of the heat sink 21 and the capacitors 56, whereby the capacitors 56 are fixed to the heat sink 21.

Here, note that the connector 44, the heat sink 21 and the cover 23 shown in FIG. 8 are kept inverted when the silicon bonding material 66 is filled into the gap formed between the concave portion 48h and the convex portion 47b, or when the silicon bonding material 66 is filled into the gap between the concave portion 21c and the capacitors 56.

Now, reference will be made to a procedure of assembling the electric power steering apparatus as constructed above.

First of all, the electric motor 1 is assembled in the following manner. The permanent magnet 3 is magnetized to eight poles by a magnetizer after fixedly bonded to the output shaft 2, and an inner race of the bearing 60 is press-fitted over the output shaft 2 to form the rotor 4.

Then, the armature windings 9 of U, V and W phases are wound around the twelve salient poles 7, respectively, of the stator 5 through the insulators 8 at locations displaced at an electrical angle of 120 degrees apart from one another, so that four windings are formed for each of U, V, and W phases, thus providing a total of twelve windings. The respective U-phase winding portions have their winding-start ends and winding-termination ends connected with one another to form an entire U-phase armature winding, and the V-phase and W-phase armature windings are also formed in the same manner. After formation of the armature windings of the U, V and W phases, the winding-termination ends thereof are mutually connected with one another to provide a neutral point, whereas the winding start ends of the armature windings of the U, V and W phases are connected with the winding terminals 10, respectively. Thereafter, the stator 5 with the windings thus formed is inserted into and fixed to the housing 12.

Subsequently, after an outer race of a bearing 61 is fixedly attached to the housing 12, the stator 6b of the rotational position sensor 6 is fixedly attached to the housing 12. Then, the output shaft 2 of the rotor 4 is inserted into an inner race of the bearing 61. After a spacer 62 is press-fitted over the output shaft 2, the output shaft 2 is fixed to the inner race of the bearing 61. Further, the rotor 6a of the rotational position sensor 6 and the coupling 16 are press-fitted over the output shaft 2, and an end cover 64 with a rubber ring 63 fitted thereto is inserted into the housing 12 from the rear end side of the electric motor 1 and fixedly attached to the housing 12 by means of screws 65.

Next, reference will be made to a procedure of assembling the control unit 20.

First of all, component parts such as the semiconductor switching elements Q1 through Q6, the capacitors 30, the shunt resistors 31, etc., which constitute the power main body 20a, and component parts such as the microcomputer 32, its peripheral circuit elements, etc., which constitute the control main body 20b, are mounted on the metal substrate 22 with the individual electrodes being coated with a cream solder, and the cream solder is melted by using a reflow device, so that the above-mentioned respective component parts are soldered to the electrodes of the metal substrate 22.

In addition, the capacitors 56 are received in the capacitor receiving portions 48f of the connector frame 48, and the terminals of the capacitors 56 are bonded by TIG welding to the conductive plates 49, 50, 51 exposed from the insulating resin.

Then, the coils 54, 55 are inserted into coil insertion portions 48a, 48b, respectively. Upon insertion of the coils 54, 55, the terminals 54a, 55c penetrate through the holes 48e formed in the bottoms of the coil receiving portions 48a, 48b to protrude into an opposite surface of the connector frame 48, so that the terminals 54a, 55c are bonded by TIG welding to the conductive plates 49, 50, 61 exposed from the insulating resin.

Upon insertion of the coil 55, the outside diameter of the large-diameter portion 55b of the core 55a is guided by the guide 48d, and the detent 48c prevents the large-diameter portion 55b from coming off from the connector frame 48 in a state where the coil 55 has been inserted up to the bottom of the coil receiving portion 48b, whereby the coil 55 is fixedly attached and welded to the connector frame 48.

Thereafter, the connector frame 48 with the coils 54, 55 and the capacitors 56 connected therewith is fixedly attached to the outer side of the heat sink 21 by means of screws 67. The opposite sides of the pad portions 52b, 53b of the connector frame 48 are fixedly attached to the heat sink 21 by the screws 67, so that the connection between the connector frame 48 and the heat sink 21 performed by wire bonding in the following step can be ensured.

The concave portion 21c of the heat sink 21 is arranged in opposition to the capacitors 56 connected with the connector frame 48, and the silicon bonding material 66 is filled into a groove 21d and the concave portion 21c of the heat sink 21, and the concave portion 48h of the connector frame 48. After that, the guide portions 47a of the connector housing 47 are inserted into the side portions 48g of the connector frame 48, whereby the connector housing 47 is fitted into the connector frame 48 while being guided by the guide portions 47a, and is fixedly attached to the heat sink 21 by means of screws 68.

Under such a condition, the guide portions 47a and the side portions 48g are fitted with each other, so the terminals 49a, 50a, 52a, 53a and the connector housing 47 can be positioned with respect to one another.

Moreover, the silicon bonding material 66 is filled into the gap formed between the concave portion 48h of the connector frame 48 and the convex portion 47b of the connector housing 47, whereby the air tightness between the terminals 49a, 50a, 52a, 53a and the connector housing 47 can be ensured.

Further, the silicon bonding material 66 is filled into the gap between the concave portion 21 c of the heat sink 21 and the capacitors 56, whereby the capacitors 56 are bonded and fixed to the heat sink 21.

Then, the frame 40 is fitted into the heat sink 21 in such a manner that the motor terminals Mm and the sensor connector 43 are protruded from the hole 21a of the heat sink 21 to the outside, and the frame 40 is fixedly secured to the inner side of the heat sink 21 by screws 69. At this time, the frame 40 is fixed to the heat sink 21 by the three screws 69 that are arranged at the opposite sides of the pad portions 41a, Smp and at the opposite sides of the pad portion 42a.

Thereafter, the metal substrate 22 with parts mounted thereon is fixedly fastened to the heat sink 21 by the screws 70. Specifically, the screws 70 are inserted into the holes 22c formed in the metal substrate 22 at a total of six locations including four corners thereof and two places surrounding the power main body 20a, thereby fixedly fastening the metal substrate 22 to the heat sink 21.

After that, the pad portions 41a, Smp, 42a of the frame 40, the pad portions 52b, 53b of the connector frame 48, and the wire bonding pad portions 26eb of the metal substrate 22 are electrically connected to one another through the aluminum wires W of 300 μm in diameter by means of wire bonding. Then, the cover 23 with a precoat gasket 71 coated thereon and solidified beforehand is arranged at an opening portion of the heat sink 21, and fixedly fastened to the heat sink 21 by screws 72.

Subsequently, the electric motor 1 and the control unit 20 separately assembled in the above manner are assembled with each other. A precoat gasket 73 is coated and solidified beforehand on the outside of the heat sink 21 of the control unit 20, and the control unit 20 is fixedly attached to the bracket 12a of the electric motor 1 by means of screws 74. At this time, the mating surfaces of the electric motor 1 and the control unit 20 are sealed by the precoat gasket 73.

Then, the winding terminals 10 of the electric motor 1 and the motor terminals Mm of the control unit 20 are fixed to each other by screws 75 whereby they are electrically connected with each other.

Finally, a connector (not shown) from the rotational position sensor 6 of the electric motor 1 is fitted to the sensor connector 43 of the control unit 20 to provide electrical connection therebetween, and the assembly of the electric power steering apparatus is completed.

As described in the foregoing, according to the electric power steering apparatus of this first embodiment, the power main body 20a and the control main body 20b are formed on the metal substrate 22, and the power main body 20a and the control main body 20b are electrically connected to each other by the wiring patterns 26a through 26e on the metal substrate 22 and the power circuit metal columns 28a and the control circuit metal columns 28b. As a result, no external connecting member connecting between the power main body 20a and the control main body 20b is required, so the apparatus can be reduced in size and cost, and the reliability of bonding or connection between the power main body 20a and the control main body 20b can be improved.

In addition, the power circuit is constructed by electrically connecting the power main body 20a and the multilayer wiring patterns 26a, 26b, 26c, 26d, 26e with one another, so the length of an electric path through which current flows is decreased, thereby making it possible to reduce electric power loss, and to suppress the generation of electromagnetic noise.

Further, between the adjacent layers of the wiring patterns 26a through 26e in regions where at least semiconductor switching elements Q1 through Q6 are mounted on the metal substrate 22, in particular in areas opposing to the heat dissipation plates (heat spreaders) hs of the semiconductor switching elements Q1 through Q6, there are formed the power circuit metal columns 28a in a line in the thickness direction of the metal substrate 22. As a result, the heat generated by semiconductor switching elements Q1 through Q6 is conducted to the metal plate 24 in a rectilinear manner, so the heat dissipation of the metal substrate 22 can be improved.

Furthermore, a power circuit metal column body between the adjacent layers of the wiring patterns 26a through 26e is divided into a plurality of power circuit metal columns 28a having a circular cross section. As a result, when a resin-coated copper foil (RCC) is thermally pressed to form the interlayer insulating layers 27a, 27b, 27c, 27d, the flowability of the resin of the resin-coated copper foil is improved, so defects such as voids in the interior of the metal substrate 22 can be reduced, thus making it possible to improve the quality of the metal substrate 22.

Still further, the cross sectional area of each of the metal columns 28a for the power circuit, on which high current parts such as semiconductor switching elements Q1 through Q6, etc., are mounted, is formed to be larger than the cross sectional area of each of the control circuit metal columns 28b for small current. Consequently, the heat and large current of the power main body 20a can be passed through the power circuit metal columns 28a, and the stress generated in the soldered portions of the low current parts of the control main body 20b by a temperature change therein can be reduced, thus making it possible to improve the performance, the thermal resistance and the durability of the apparatus.

In addition, each of the power circuit metal columns 28a has a circular shape with a diameter of 0.7 mm or more in cross section, and each of the control circuit metal columns 28b has a circular shape with a diameter of 0.4 mm or less in cross section. As a result, the heat and large current of the power main body 20a can be passed through the power circuit metal columns 28a, and the stress generated in the soldered portions of the parts of the control main body 20b by a temperature change therein can be reduced, thus making it possible to improve the performance, the thermal resistance and the durability of the apparatus.

Moreover, the metal substrate 22 has five layers of wiring patterns 26a through 26e, and the pad portions 26ep are formed on the wiring pattern 26e on the top layer, with a lower surface of each pad portion 26ep and an upper surface of the second uppermost wiring pattern 26d being connected to each other by means of a corresponding control circuit metal column 28b, so wiring for the wiring patterns is mainly made in four layers from the second uppermost layer to the lowermost or bottom fifth layer. Accordingly, wiring pattern components formed in the wiring pattern 26e on the top or uppermost layer can be decreased, and hence the outside dimensions of the metal substrate 22 can be made smaller, thus making it possible to reduce the size of the apparatus.

Further, any wiring pattern other than the check pattern for checking the metal substrate 22 after the component parts has been mounted thereon is not formed in the wiring pattern 26e on the top layer. Thus, the packaging density of the parts mounted on the wiring pattern 26e on the top layer is raised or increased, and hence the outside dimensions of the metal substrate 22 can be made smaller, thus making it possible to reduce the size of the apparatus.

Furthermore, a convex portion 26f is formed on an upper surface of each pad portion 26ep, and a component part is mounted on this convex portion 26f and soldered to the pad portion 26ep. Accordingly, a solder layer can be formed thick in its portion except for that portion which corresponds to the convex portion 26f, so stress generated in the soldered portion of the part due to a temperature change can be reduced, thus making it possible to improve the reliability of bonding or connection of the soldered portion.

In addition, the metal substrate 22, the uppermost insulating layer 27d is formed of a material whose modulus of elasticity is smaller than those of the other insulating layers 27a through 27c. As a result, stress generated in the soldered portions of parts due to a temperature change can be reduced by the insulating layer 27d having a small modulus of elasticity, so the thermal resistance and the durability of the apparatus can be improved.

Moreover, in the metal substrate 22, the heat dissipation insulating layer 25 on the metal plate 24 is formed of a material that is larger in thermal conductivity than the insulating layers 27a through 27d. Accordingly, the heat generated by the heat-generating parts such as the semiconductor switching elements Q1 through Q6, etc., can be conducted to the metal plate 24 with a smaller thermal resistance, so the heat dissipation of the metal substrate 22 can be improved.

Further, the metal substrate 22 has the holes 22c formed therein for fixed attachment thereof to the heat sink 21, and around each hole 22c, there are arranged the plurality of fixed metal columns 28d, which are disposed between adjacent layers of the wiring patterns 26a through 26e on individual lines in the thickness direction of the metal substrate 22. Accordingly, the tightening force of a screw 70, being passed through a corresponding hole 22c and threaded into the heat sink 21, is transmitted from the bearing surface of its head to the fixed metal columns 28d, and hence there exists only the heat dissipation insulating layer 25 as a resin layer between the head of the screw 70 and the heat sink 21, as a result of which the screw 70 becomes difficult to loose, and the metal substrate 22 can be made in intimate contact with the heat sink 21, thus making it possible to improve the thermal resistance and the durability of the apparatus.

Furthermore, a wire bonding pad portion 26eb, to which a wire W is wire bonded, is formed in the wiring pattern 26e on the top layer of the metal substrate 22, and the lower surface of the wire bonding pad portion 26eb and the upper surface of the second uppermost wiring pattern 26d are connected by the wire metal columns 28c. Accordingly, ultrasonic vibration generated at the time of wire bonding is effectively transmitted to a bonded portion or junction, so the reliability of bonding or connection by wire bonding can be improved.

Also, the bonding or connection of each wire W and each corresponding wire bonding pad portion 26eb is made in such a manner that the wire W is wire bonded to the corresponding wire bonding pad portion 26eb at a location at which the insulating layer 27d is formed on the lower surface of the wire bonding pad portion 26eb, or at a location in which a corresponding wire metal column 28c is formed on the lower surface of the wire bonding pad portion 26eb. Accordingly, the wire W and the wire bonding pad portion 26eb are bonded to each other in the lower surface of the wire bonding pad portion 26eb except for a region which extends over the metal column 28c and the interlayer insulating layer 27d. As a result, ultrasonic vibration generated at the time of wire bonding is effectively transmitted to a bonded portion or junction, so the reliability of bonding or connection by wire bonding can be improved.

In addition, the metal plate 24 of the metal substrate 22 is made of aluminum, and the heat sink 21 is similarly made of aluminum, too, so the heat generated by the heat-generating parts on the metal substrate 22 is efficiently conducted to the housing 12 of the electric motor 1 through the metal plate 24 and the heat sink 21. Accordingly, the temperature rise of the heat-generating parts on the metal substrate 22 can be suppressed, and the thermal resistance and the durability of the apparatus can be improved. Additionally, the coefficient of linear thermal expansion of the metal substrate 22 and that of the heat sink 21 become substantially the same, so t he distances between the pad portions 41a, Smp, 42a fixedly attached to the heat sink 21 and the pad portions on the metal substrate 22 become less prone to be changed due to a temperature change. As a result, the amount of displacement that is applied to aluminum wires connecting these pad portions is decreased, and the reliability of bonding or connection by wire bonding can be improved.

Moreover, the metal substrate 22 is fixedly attached to the heat sink 21 by means of the screws 70 at a total of six locations including four corners thereof and two places surrounding the power main body 20a. Thus, the power main body 20a is fixedly attached in the vicinity of its periphery to the heat sink 21, so the heat generated by the heat-generating parts on the power main body 20a is efficiently conducted to the housing 12 of the electric motor 1 through the metal plate 24 and the heat sink 21. Accordingly, the temperature rise of the heat-generating parts on the power main body 20a can be suppressed, and the thermal resistance and the durability of the apparatus can be improved.

Further, the metal substrate 22 is arranged in parallel to the axis of the electric motor 1, and at the same time, the power main body 20a is arranged at the output side of the electric motor 1 and the control main body 20b is arranged at the opposite side thereof, so the heat generated from the power main body 20a is radiated to the gear case 13 through the heat sink 21 and the bracket 12a of the electric motor 1. Accordingly, the temperature rise of the heat-generating parts on the metal substrate 22 can be suppressed, and the thermal resistance and the durability of the apparatus can be improved.

Furthermore, the power connector 45a, which is electrically connected to the battery (not shown) of the vehicle, and the signal connector 45b, by which signals are input from and output to the vehicle side through external wiring, are formed integrally with each other. As a result, in the case of the electric power steering apparatus being installed on the vehicle, the number of connectors required at the vehicle side becomes only one, thus making the insertion and removal work for the vehicle-side connector simple and easy.

Also, the number of connector housings and rubber packings for the vehicle-side connector can be reduced to one, so the reduction of cost can be made.

In addition, the connector 44 is composed of the connector frame 48 with the conductive plates 49, 50, 51 forming a wiring pattern being insert molded therein, and the connector housing 47 with the connector frame 48 being received therein, and these conductive plates 49, 50 are formed at their one end with the plus terminal 49a and the minus terminal 50a, respectively, and the coils 54, 55 and the capacitors 56 for preventing the external leakage of noise generated upon switching of the semiconductor switching elements Q1 through Q6 are connected to the conductive plates 49, 50, 51. Accordingly, the length of the electric path through which current flows is decreased, thereby making it possible to reduce electric power loss, and to suppress the generation of electromagnetic noise.

Also, since the coils 54, 55 and the capacitors 56 are received in the connector housing 47, the reduction in size of the apparatus can be made.

Moreover, the coil 55 has the core 55a that is formed into a T-shaped configuration in vertical cross section, and the connector frame 48 has the coil receiving portion 48b that is formed with the detent 48c in the form of an engagement portion, and the core 55a has the T-shaped large-diameter portion 55b that is engaged with the detent 48a. As a result, the coil 55 can be held in an appropriate manner until the terminal 55c of the coil 55 is welded to the conductive plate 51, so workability can be improved.

Further, the coils 54, 55 are inserted into the coil receiving portions 48a, 48b, respectively, of the connector frame 48 in a direction perpendicular to the terminals 49a, 50a of the vehicle connector 45, so that they are connected through welding with the conductive plates 49, 50, 51. Accordingly, the length of the electric path through which current flows is decreased, thereby making it possible to reduce electric power loss, and to suppress the generation of electromagnetic noise. In addition, the coils 54, 55 and the terminals 49a, 50a, 52a, 53a are arranged perpendicular with respect to each other, so the reduction in size of the apparatus can be made.

Furthermore, the capacitors 56 are received in the capacitor receiving portions 48f arranged in a row in the connector frame 48, so the insertion of the capacitors 56 becomes easy, and the improvement of workability can be made.

In addition, the conductive plates 49, 50, 51 are partially exposed from the insulating resin at one end side of the capacitor receiving portions 48f, and the welded portions between the exposed conductive plates 49, 50, 51 and the terminals of the capacitors 56 are arranged on a straight line, so the conductive plates 49, 50, 51 can be connected with the terminals of the capacitors 56 by means of continuous TIG welding, thus making it possible to improve workability.

Moreover, the connector housing 47 is formed with the guide portions 47a into which the opposite side portions 48g of the connector frame 48 are inserted, and the guide portions 47a serve as guides when the connector housing 47 is inserted into the connector frame 48. Thus, the work of inserting the connector housing 47 into the connector frame 48 becomes easy, thereby making it possible to improve workability.

Further, the connector 44 is composed of the connector housing 47 and the connector frame 48 received in the connector housing 47, and is fixedly secured to the heat sink 21 at a side opposite to the metal substrate 22. As a result, the overall length of the control unit 20 can be shortened, and the size of the apparatus can be decreased.

Furthermore, the connector 44 is fixedly attached to an opposite side of the metal substrate 22 with the heat sink 21 being sandwiched therebetween. Accordingly, the dimensions or distances between the terminal 52a of the signal connector 45b and the pad portion 52b to be wire bonded, and between the terminal 53a of the torque sensor connector 46 and the pad portion 53b to be wire bonded are shortened, so the amounts of materials used by the connector terminals 52, 53 can be decreased, and the reduction of cost can be made.

Further, the connector 44 is arranged in the vicinity of the rear end of electric motor 1, i.e., at a side thereof opposite to its output side, so a space at the rear end of the electric motor 1 that is shorter than the control unit 20 can be effectively used, and the projected area of the apparatus when viewed from above does not increase, thus making it possible to reduce the size of the apparatus.

Furthermore, since the connector 44 is formed with the torque sensor connector 46 together with the vehicle connector 45, the connectors can be collected in one place, thus contributing to the reduction in size of the apparatus.

In addition, since the torque sensor connector 46 is constructed of the connector housing 47 and the connector frame 48, which are the same as those of the vehicle connector 45, the number of parts can be reduced, and hence the cost and size of the apparatus can also be reduced.

Moreover, the concave portion 48h is formed on the connector frame 48 in a portion thereof into which the terminals 49a, 50a, 52a, 53a protrude, and the convex portion 47b is formed in the connector housing 47 at an entrance portion thereof into which the terminals 49a, 50a, 52a, 53a are inserted, so that the silicon bonding material 66 is filled into the gap formed between the concave portion 48h and the convex portion 47b with the connector housing 47 being completely inserted into the connector frame 48. Accordingly, the air tightness between the terminals 49a, 50a, 52a, 53a and the connector housing 47 can be ensured by the silicon bonding material 66, and the water tightness or resistance of the apparatus can be improved.

Further, the concave portion 21c is formed in a portion of the heat sink 21 onto which the connector frame 48 is mounted, and the concave portion 21c and the capacitors 56 of the connector frame 48 are arranged in opposition with each other, with the silicon bonding material 66 being filled into the gap between the concave portion 21c of the heat sink 21 and the capacitors 56. As a result, the capacitors 56 are fixed to the heat sink 21 through the silicon bonding material 66, whereby the vibration resistance of the apparatus can be improved.

Furthermore, the thermal conductive sheet 29 having high thermal conductivity and excellent flexibility is fitted between the upper surface of each capacitor 30, which serves to absorb current ripples, and the inner surface of the cover 23 made of aluminum. Thus, the heat generated from the capacitors 30 is radiated to the cover 23 in addition to the metal substrate 22, whereby the temperature rise of the capacitor 29 can be suppressed, and the durability of the capacitor 29 can be improved. Also, since the thermal conductive sheet 29 having excellent flexibility is fitted between the upper surface of each capacitor 30 and the inner surface of the cover 23, the vibration of the upper portions of the capacitors 30 can be suppressed, whereby the vibration resistance of the apparatus can be improved, thus enhancing the reliability thereof.

Embodiment 2

Figure 9:
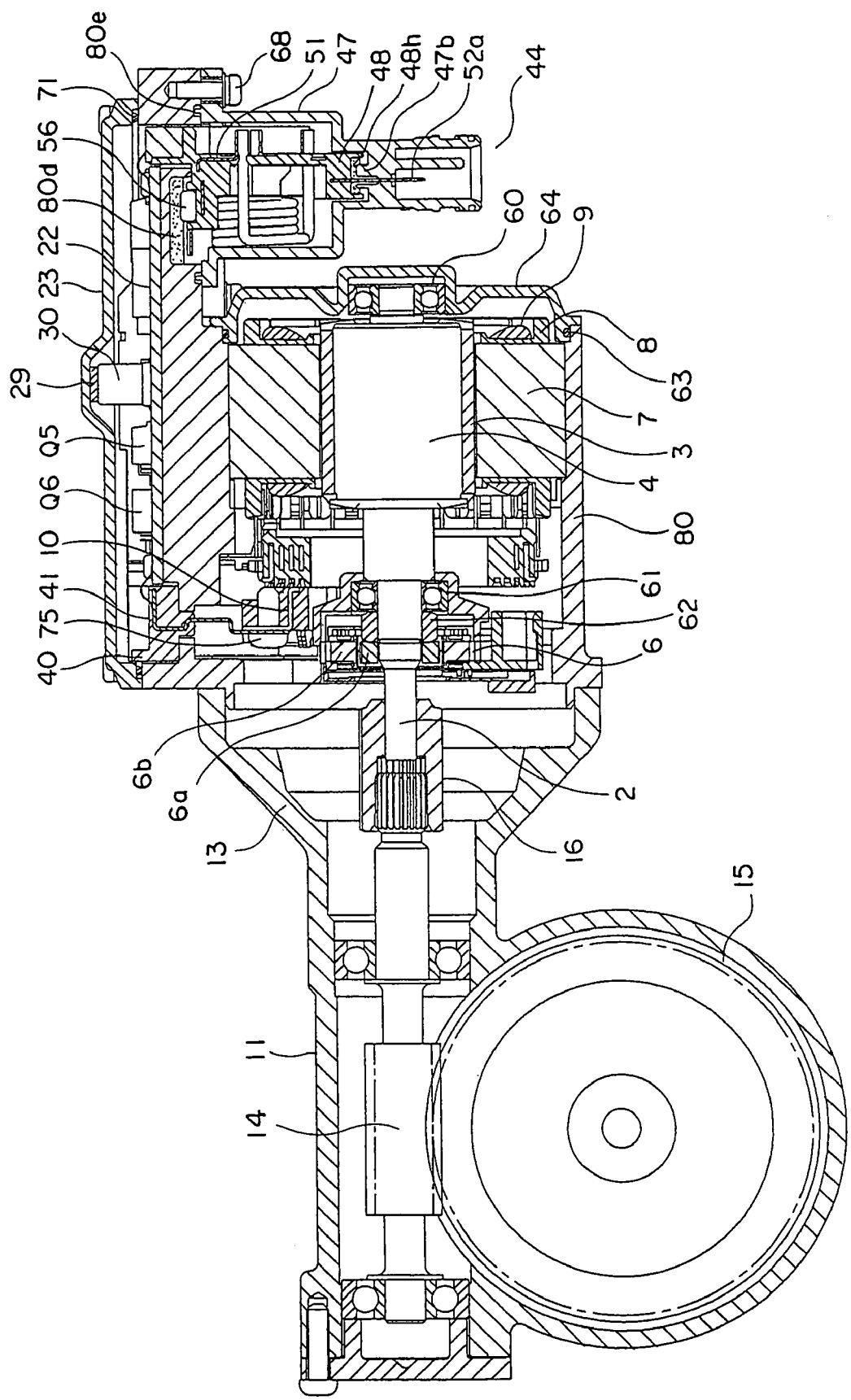
FIG. 9 is a cross sectional view showing an electric power steering apparatus according to a second embodiment of the present invention.
Figure 10:
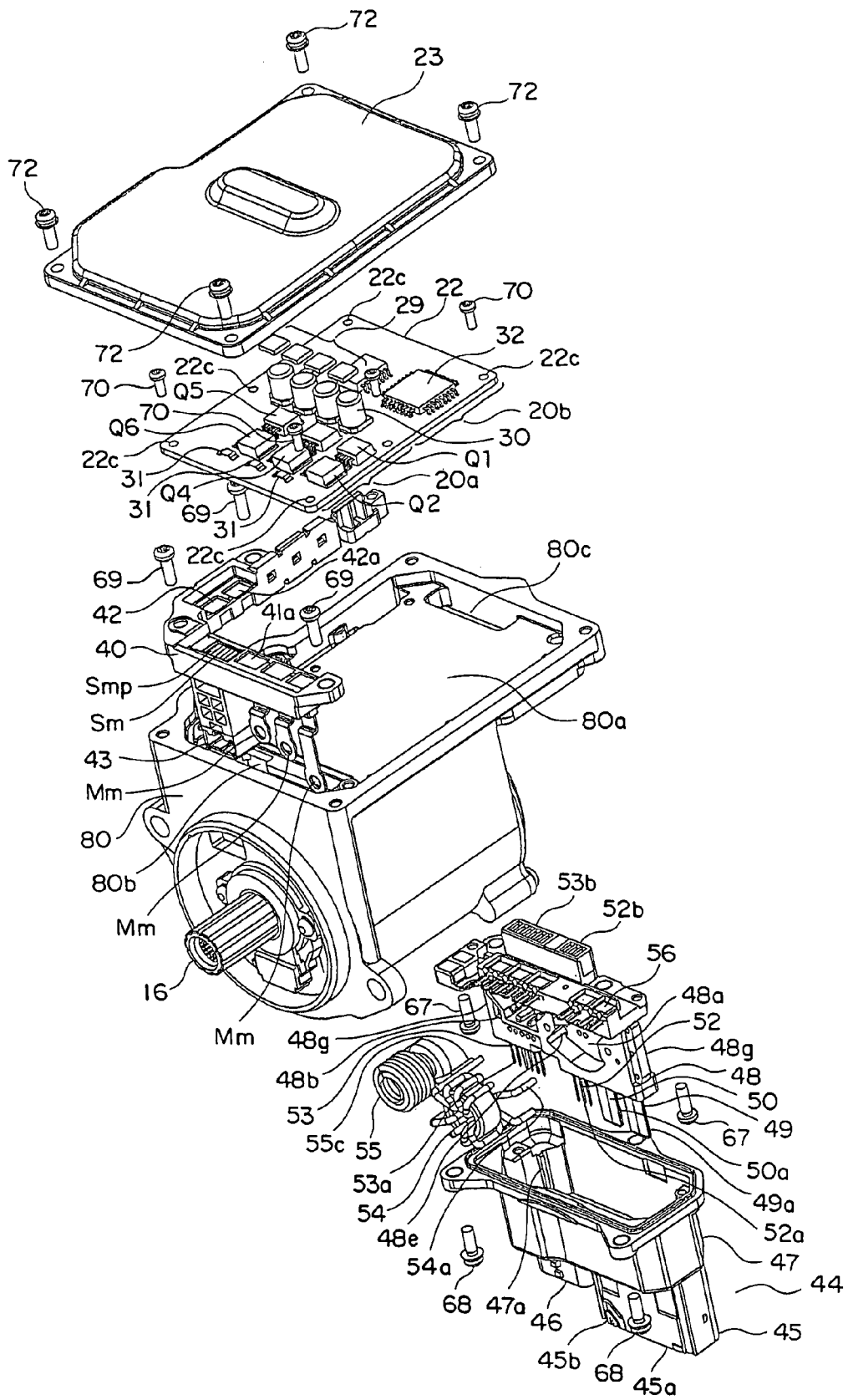
FIG. 10 is an exploded perspective view showing a control unit of the electric power steering apparatus in FIG. 2.

FIG. 9 is a cross sectional view showing an electric power steering apparatus according to a second embodiment of the present invention. FIG. 10 is an exploded perspective view that shows a control unit 20 of FIG. 9.

In this second embodiment, the housing 12 of the electric motor 1 and the heat sink 21 of the control unit 20 of the first embodiment are integrated with each other to provide a housing 80. The other construction of the second embodiment is similar to that of the electric power steering apparatus of the first embodiment.

In this second embodiment, the housing 80 is formed with a planar portion 80a at a side surface thereof that is in parallel to an axis of an electric motor 1. A metal substrate 22 is arranged on the planar portion 80a, and fixedly attached thereto by means of screws 70. A frame 40 is also fixedly attached to the housing 80 by means of the screws 70.

The motor terminals Mm and the sensor connector 43 are inserted into a hole 80b formed in the housing 80. The motor terminals Mm are connected with the winding terminals 10, and the sensor connector 43 is connected with a connector (not shown) from the rotational position sensor 6.

In addition, the connector 44 is mounted on the housing 80 at a side opposite to the planar portion 80a, and a concave portion 80d is formed in a portion of the housing 80 to which the connector frame 48 is attached. The silicon bonding material 66 is filled into a gap between the concave portion 80d and the capacitors 56 connected to the connector frame 48, whereby the capacitors 56 are fixed to the housing 80.

In the assembly procedure of this second embodiment, the processes up to the assembly of the electric motor 1 is similar to those of the first embodiment.

The connector frame 48 with which the coils 54, 55 and the capacitors 56 are connected is fixedly fastened by the screws 67 to the housing 80 with which the electric motor 1 is assembled.

Then, the silicon bonding material 66 is filled into a groove 80e and the concave portion 80d of the housing 80, and into the concave portion 48h of the connector frame 48, respectively, and the connector housing 47 is fixedly attached to the housing 80 by means of the screws 68.

Subsequently, the frame 40 is fixedly fastened to the housing 80 by means of the screws 69, after which the metal substrate 22 with component parts mounted thereon is fixedly attached to the housing 80 by the screws 70.

Thereafter, the pad portions 41a, Smp, 42a of the frame 40, the pad portions 52b, 53b of the connector frame 48, and the metal substrate 22 are electrically connected to one another through the aluminum wires by means of wire bonding, and a cover 23 with a precoat gasket 71 coated thereon and solidified beforehand is arranged at an opening portion of the housing 80, and fixedly fastened to the housing 80 by screws 72.

Finally, the winding terminals 10 of the electric motor 1 and the motor terminals Mm of the control unit 20 are fixed to each other by screws 75, and a connector (not shown) from the rotational position sensor 6 is fitted to the sensor connector 43 of the control unit 20 to provide electrical connection therebetween, and the assembly of the electric power steering apparatus is completed.

According to the electric power steering apparatus of this second embodiment, the housing 12 of the electric motor 1 and the heat sink 21 of the control unit 20 of the first embodiment are integrated with each other to provide the housing 80, so parts such as the heat sink 21, the screws 74, the precoat gasket 73, etc., become unnecessary, and hence the number of processes for assembling these parts is reduced, thereby making it possible to reduce the manufacturing cost of the apparatus.

In addition, the bracket 12a and the like, which would be necessary when the electric motor 1 and the control unit 20 are formed separately from each other, is not required, and it is also not necessary to ensure a tool space for tightening the screws 74, so the reduction in size of the apparatus can be made.

Moreover, there is no impediment to obstruct thermal conduction, such as the precoat gasket 73, gaps, etc., on the mounting surfaces of the electric motor 1 and the control unit 20, so the heat generated by the heat-generating parts on the metal substrate 22 is conducted to the housing 80 of the electric motor 1 via the metal plate 24 in an effective manner. Accordingly, the temperature rise of the heat-generating parts on the metal substrate 22 can be suppressed, thereby making it possible to improve the thermal resistance and the durability of the apparatus.

Although in the above-mentioned embodiments, the number of magnetic poles of the permanent magnet 3 is eight and the number of salient poles of the stator 5 is twelve, the present invention is not limited to such a combination, but any combination of the number of magnetic poles and the number of salient poles may be employed for the purpose of the invention.

Further, the electric power steering apparatus is installed in an engine room, and the precoat gaskets 71, 73 are fitted and sealed by the silicon bonding material 66 so as to ensure waterproofness, but the electric power steering apparatus may instead be arranged in a passenger compartment, and in such a case, the precoat gaskets 71, 73 and the silicon bonding material 66 may be removed.

Furthermore, though the metal columns 28a, 28b, 28c, 28d are solid cylinders or circular columns, in case where the metal columns 28a, 28b, 28c, 28d are formed of copper by means of thick plating and etching, they become truncated cones, respectively, so the metal columns 28a, 28b, 28c, 28d may be trapezoidal in axial cross section.

In addition, the metal plate 24 of the metal substrate 22 is made of aluminum or AlSiC material, but other metal plates such as copper may instead be used.

Moreover, although the resolver is used as the rotational position sensor 6, the present invention is not limited to the use of such a resolver, but other magnetic sensing elements such as a magneto-resistive element, a Hall element, a Hall IC or the like may instead be used.

Further, the electric motor 1 is not limited to the brushless motor, but may be an induction motor or a switched reluctance motor (SR motor).

While the invention has been described in terms of preferred embodiments, those skilled in the art will recognize that the invention can be practiced with modifications within the spirit and scope of the appended claims.

What is claimed is:

1. An electric power steering apparatus including an electric motor for outputting assist torque to a steering wheel of a vehicle, and a control unit for controlling the driving of said electric motor, said control unit comprising:

a power main body that includes a bridge circuit composed of a plurality of semiconductor switching elements for switching a current supplied to said electric motor in accordance with torque assisting said steering wheel;

a control main body that generates a drive signal to control said bridge circuit based on the steering torque of said steering wheel;

a metal substrate that is composed of a plurality of insulating layers and a plurality of conductive layers having wiring patterns respectively formed thereon, said insulating layers and said conductive layers being alternately laminated one over another on a metal plate; and a heat sink with said metal substrate being fixedly attached thereto;

wherein said power main body and said control main body are arranged on the same surface of said metal substrate, and said power main body and said control main body are electrically connected to each other through said metal substrate.

2. The electric power steering apparatus as set forth in claim 1, further comprising:

a power connector that is electrically connected to a power supply of said vehicle; and a signal connector to and from which a signal is input and output through external wiring;

wherein said power connector and said signal connector are at least integrally formed with each other to provide one connector.

3. The electric power steering apparatus as set forth in claim 1, further comprising:

a capacitor that is mounted on said metal substrate for absorbing ripples of said current; and a cover that fastens to said heat sink for receiving therein said metal substrate and said capacitor;

wherein said cover is made of a metallic material having high conductivity, and a high thermal conductive heat dissipation material is fitted between said cover and said capacitor.

4. The electric power steering apparatus as set forth in claim 1, wherein
said electric motor has a motor housing; and
said motor housing is integrally formed with said heat sink.

5. The electric power steering apparatus as set forth in claim 1, wherein
in said metal substrate, said individual conductive layers are connected with one another by power circuit metal column bodies each arranged in a line in a thickness direction of said metal substrate in a region where said semiconductor switching elements are mounted.

6. The electric power steering apparatus as set forth in claim 5, wherein
said power circuit metal column bodies are arranged in a region facing heat dissipation plates of said semiconductor switching elements.

7. The electric power steering apparatus as set forth in claim 5, wherein
each of said power circuit metal column bodies comprises a plurality of divided power circuit metal columns.

8. The electric power steering apparatus as set forth in claim 7, wherein
each of said power circuit metal columns is of a columnar shape or a cylindrical shape.

9. The electric power steering apparatus as set forth in claim 7, further comprising a plurality of control circuit metal columns, wherein
each of said power circuit metal columns is larger in cross-sectional area than each of said control circuit metal columns that are connected to said conductive layers in said control main body.

10. The electric power steering apparatus as set forth in claim 9, wherein
each of said power circuit metal columns is formed to have a diameter of 0.7 mm or more, and each of said control circuit metal columns is formed to have a diameter of 0.4 mm or less.

11. The electric power steering apparatus as set forth in claim 9, wherein
said metal substrate has a pad portion to be brazed to a part mounted thereon, said pad portion being arranged on a surface of an outermost conductive layer most remote from said heat sink, and said pad portion and an adjacent conductive layer, which is arranged adjacent to said outermost conductor layer, are connected to each other by one of said control circuit metal columns or one of said power circuit metal columns.

12. The electric power steering apparatus as set forth in claim 11, wherein
said metal substrate has a convex portion formed on a surface of said pad portion, and said mounted part is brazed to said convex portion.

13. The electric power steering apparatus as set forth in claim 11, wherein
in said metal substrate, the insulating layer of said outermost conductive layer is made of a material whose modulus of elasticity is smaller than those of the other insulating layers.

14. The electric power steering apparatus as set forth in claim 11, wherein
in said metal substrate, a heat dissipation insulating layer on said metal plate is formed of a material that is larger in thermal conductivity than the other insulating layers.

15. The electric power steering apparatus as set forth in claim 11, wherein
said metal substrate has a hole formed therein for fixed attachment thereof to said heat sink, and around said hole, said individual conductive layers are connected with one another by fixed metal columns that are arranged in a line in a thickness direction of said metal substrate.

16. The electric power steering apparatus as set forth in claim 1, wherein
in said metal substrate, said conductive layers are five or more layers.

17. The electric power steering apparatus as set forth in claim 1, wherein
said metal substrate has a wire bonding pad portion, to which a wire is bonded by wire bonding, formed on a surface of an outermost conductive layer that is most remote from said heat sink, and said wire bonding pad portion and an adjacent conductive layer, which is adjacent to at least said outermost conductive layer, are connected to each other by wire metal columns.

18. The electric power steering apparatus as set forth in claim 17, wherein
in said metal substrate, a connected portion of said wire bonding pad portion that is connected with said wire is in a region that is in opposition to said wire metal columns or said insulating layers.

19. The electric power steering apparatus as set forth in claim 1, wherein
in said metal substrate, said metal plate is made of aluminum.

20. The electric power steering apparatus as set forth in claim 1, wherein
said heat sink is made of aluminum.

21. The electric power steering apparatus as set forth in claim 1, wherein
said metal substrate is fixedly attached, in at least a peripheral portion of said power main body, to said heat sink.

22. The electric power steering apparatus as set forth in claim 1, wherein
in said metal substrate, said metal plate is made of an AlSiC material in which silicon carbide particles are distributed in aluminum.

23. The electric power steering apparatus as set forth in claim 22, wherein
in said metal substrate, said metal plate has a thickness of about 1.4 mm to 1.6 mm.

24. The electric power steering apparatus as set forth in claim 1, wherein
said heat sink is made of an AlSiC material in which silicon carbide particles are distributed in aluminum.

25. The electric power steering apparatus as set forth in claim 1, wherein
said metal substrate is arranged in parallel to an axis of said electric motor, and said power main body is arranged at an output side of said electric motor, and said control main body is arranged at a side opposite to the output side of said electric motor.

26. An electric power steering apparatus including an electric motor for outputting assist torque to a steering wheel of a vehicle, and a control unit for controlling the driving of said electric motor,
said control unit comprising:
a power main body including a bridge circuit composed of a plurality of semiconductor switching elements for switching a current supplied to said electric motor in accordance with torque assisting said steering wheel;

a control main body that generates a drive signal to control said bridge circuit based on the steering torque of said steering wheel;

a metal substrate that is composed of a plurality of insulating layers and a plurality of conductive layers having wiring patterns respectively formed thereon, said insulating layers and said conductive layers being alternately laminated one over another on a metal plate;

a heat sink with said metal substrate being fixedly attached thereto;

a power connector that is electrically connected to a power supply of said vehicle; and a signal connector to and from which a signal is input and output through external wiring;

wherein said power connector and said signal connector are at least integrally formed with each other to provide one connector.

27. The electric power steering apparatus as set forth in claim 26, wherein said one connector is composed of a connector frame in which conductive plates forming wiring patterns and having terminals respectively formed at one end are insert molded, and a connector housing in which said connector frame is received; and a plurality of coils and capacitors for preventing the external leakage of noise generated upon switching of said semiconductor switching elements are connected to said conductive plates.

28. The electric power steering apparatus as set forth in claim 27, wherein said coil is constructed by winding a conductor around a core that has a T-shaped cross section when cut along an axial direction thereof, and said core has a large-diameter portion that is engaged with an engagement portion formed on said connector frame in a resilient manner.

29. The electric power steering apparatus as set forth in claim 27, wherein said coils are inserted in a direction orthogonal to said terminals, and connected with said conductive plates.

30. The electric power steering apparatus as set forth in claim 27, wherein in said connector, an adhesive resin is filled in between a terminal inserted portion, which is formed on said connector housing and into which said terminals are inserted, and a terminal protruded portion, which is formed on said connector frame and into which said terminals protrude.

31. The electric power steering apparatus as set forth in claim 30, wherein a convex portion is formed on said terminal inserted portion, and a concave portion is formed in said terminal protruded portion, with an adhesive resin being filled into a gap between said convex portion and said concave portion.

32. The electric power steering apparatus as set forth in claim 27, wherein said plurality of capacitors are arranged in a row on said connector frame, and connected with said conductive plates.

33. The electric power steering apparatus as set forth in claim 32, wherein said capacitors are connected with said conductive plates by TIG welding to form welded portions.

34. The electric power steering apparatus as set forth in claim 33, wherein in said capacitors, said welded portions are arranged on a straight line.

35. The electric power steering apparatus as set forth in claim 27, wherein at least one of said connector frame and said connector housing is formed with a guide portion that serves to guide the insertion of said connector frame when said connector frame is inserted into said connector housing.

36. The electric power steering apparatus as set forth in claim 27, wherein a concave portion is formed in a portion of said heat sink onto which said connector frame is mounted, and said concave portion of said heat sink and said capacitors connected with said connector frame are arranged in opposition to each other, with an adhesive resin being filled into said concave portion thereby to fixedly attach said capacitors to said heat sink.

37. The electric power steering apparatus as set forth in claim 26, wherein said connector is arranged at a side opposite to an output side of said electric motor.

38. The electric power steering apparatus as set forth in claim 26, wherein said connector is arranged at a side of said heat sink opposite to said metal substrate.

39. The electric power steering apparatus as set forth in claim 26, wherein said connector is arranged at an opposite side of said metal substrate with said heat sink being sandwiched therebetween.

40. The electric power steering apparatus as set forth in claim 26, wherein said connector includes a torque sensor connector that is electrically connected to a torque sensor for detecting the torque of said steering wheel.

41. The electric power steering apparatus as set forth in claim 40, further comprising a connector housing and a connector frame, wherein said connector housing includes a housing of said torque sensor connector, and said connector frame includes a frame of said torque sensor connector.

42. An electric power steering apparatus including an electric motor for outputting assist torque to a steering wheel of a vehicle, and a control unit for controlling the driving of said electric motor, said control unit comprising:

a power main body including a bridge circuit composed of a plurality of semiconductor switching elements for switching a current supplied to said electric motor in accordance with torque assisting said steering wheel;

a control main body that generates a drive signal to control said bridge circuit based on the steering torque of said steering wheel;

a metal substrate that is composed of a plurality of insulating layers and a plurality of conductive layers having wiring patterns respectively formed thereon, said insulating layers and said conductive layers being alternately laminated one over another on a metal plate;

a capacitor that is mounted on said metal substrate for absorbing ripples of said current;

a heat sink with said metal substrate being fixedly attached thereto; and a cover that fastens to said heat sink for receiving therein said metal substrate and said capacitor;

wherein said cover is made of a metallic material having high conductivity, and a high thermal conductive heat dissipation material is fitted between said cover and said capacitor.

43. The electric power steering apparatus as set forth in claim 42, wherein
said high thermal conductive heat dissipation material is a thermal conductive sheet.

44. An electric power steering apparatus including an electric motor for outputting assist torque to a steering wheel of a vehicle, and a control unit for controlling the driving of said electric motor,
said electric motor having a motor housing;
said control unit comprising:
a power main body including a bridge circuit composed of a plurality of semiconductor switching elements for switching a current supplied to said electric motor in accordance with torque assisting said steering wheel:
a control main body that generates a drive signal to control said bridge circuit based on the steering torque of said steering wheel:
a metal substrate that is composed of a plurality of insulating layers and a plurality of conductive layers having wiring patterns respectively formed thereon, said insulating layers and said conductive layers being alternately laminated one over another on a metal plate: and
a heat sink with said metal substrate being fixedly attached thereto;
wherein said motor housing is integrally formed with said heat sink.

45. The electric power steering apparatus as set forth in claim 44, wherein
said motor housing is formed with a planar portion at a side surface thereof that is in parallel to an axis of said electric motor, and said metal substrate is arranged on the planar portion.

\* \* \* \* \*